H. JOSEPHSON.
BRAKE MECHANISM FOR AUTOMOBILES.
APPLICATION FILED AUG. 11, 1917.
1,339,895.
Patented May 11, 1920.
3 SHEETS—SHEET 1.
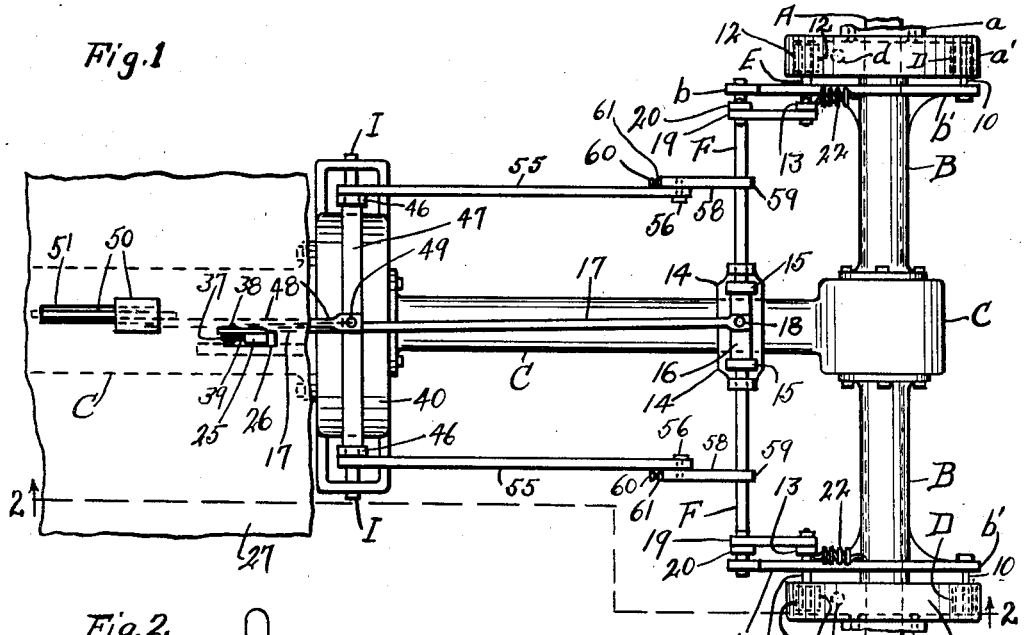
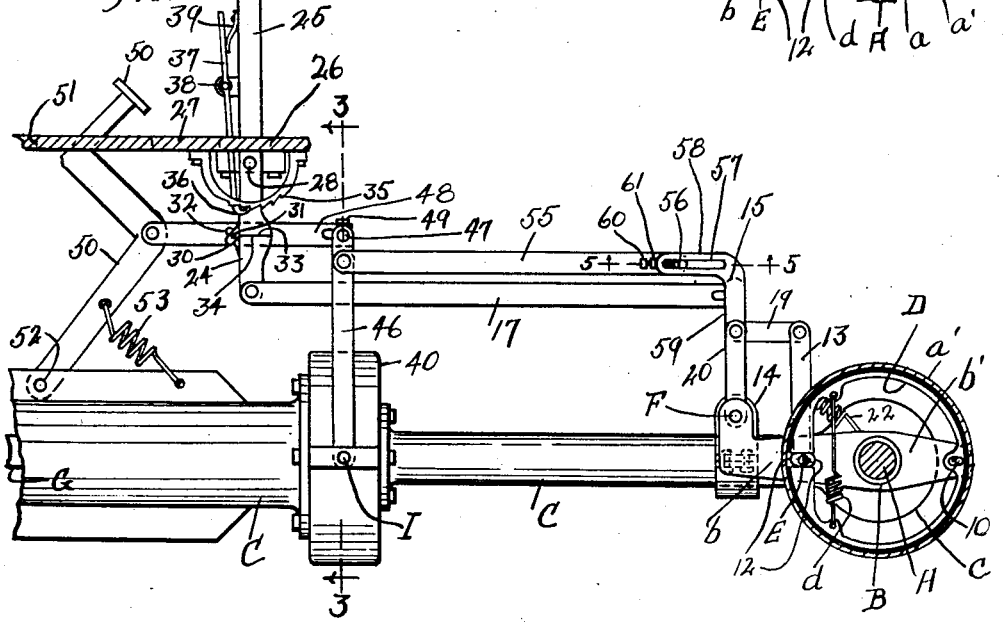
Witnesses.
Inventor.
Henry Josephson
By
his Attorney.

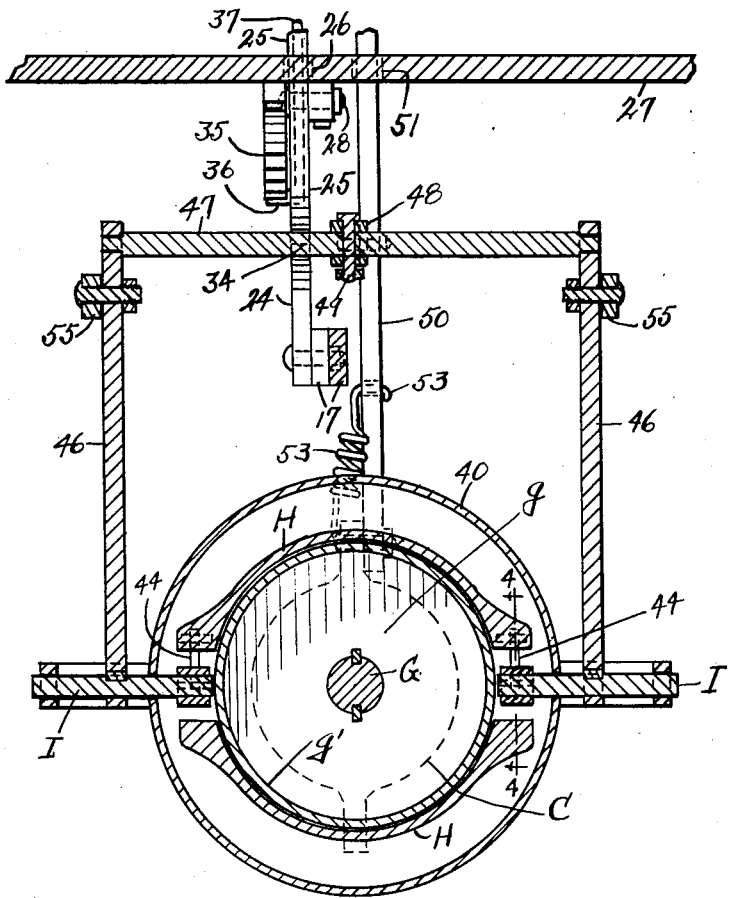

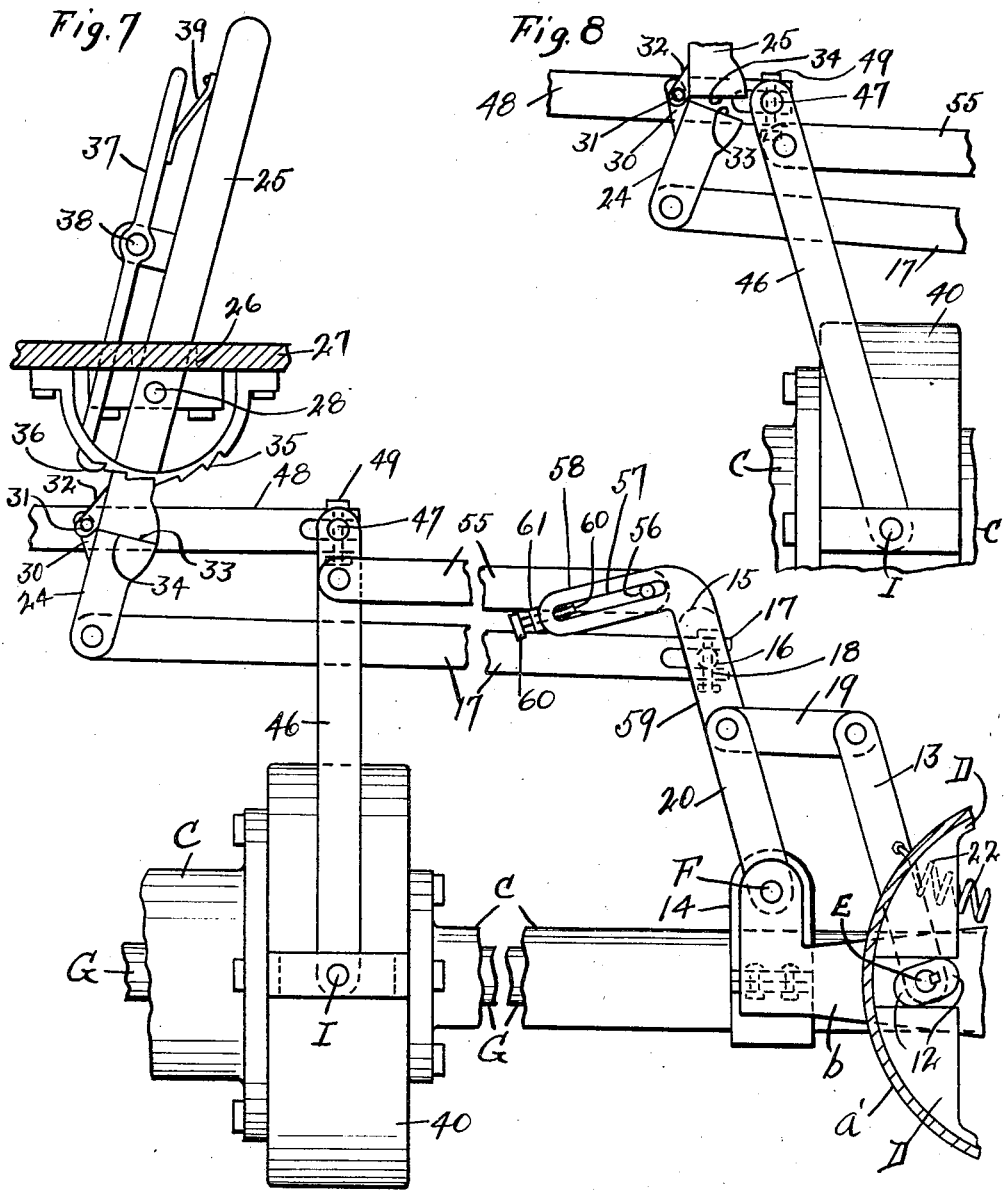

UNITED STATES PATENT OFFICE.

HENRY JOSEPHSON, OF CLEVELAND, OHIO.

BRAKE MECHANISM FOR AUTOMOBILES.

1,339,895. Specification of Letters Patent. Patented May 11, 1920.

Application filed August 11, 1917. Serial No. 185,650.

*To all whom it may concern:*

Be it known that I, HENRY JOSEPHSON, a citizen of the United States, residing at Cleveland, in the county of Cuyahoga and State of Ohio, have invented a new and useful Brake Mechanism for Automobiles, of which the following is a specification.

This invention relates to improvements in brake-mechanism for automobiles, and pertains more especially to brake-mechanism in which are employed hand-operated means, generally referred to as the "emergency" brake or brakes, for braking the rear wheels and connected axle-sections of the vehicle and in which are also employed foot-operated means, generally referred to as the "foot-brake," for braking the driving shaft employed in transmitting power through the medium of suitable gearing to said axle-sections and connected wheels.

One object is to provide improved means whereby brake-shoes which are normally in their non-braking position and employed in braking the rear wheels or driven rotary members of the vehicle, and a brake-shoe or brake-shoes which are normally in a non-braking position and employed in braking a shaft employed in transmitting power to said wheels or driven rotary members can be actuated simultaneously into their braking position.

Another object is to provide improved means for actuating the brake-shoes employed in braking the rear wheels and connected axle-sections into their braking position during the actuation into braking position of the brake-shoe or brake-shoes employed in braking the hereinbefore mentioned shaft, and to render the first-mentioned brake-shoes capable of being actuated into their braking position independently of the shaft-braking brake-shoe or brake-shoes.

Another object is not only to have two suitably arranged rock-shafts provided with suitably arranged arms carrying an equalizing bar and employed in actuating certain brake-shoes of my improved brake-mechanism into their braking position during the rotation of said rock-shafts by movement of said bar in the required direction, but to provide such an improved operative connection between said bar and a lever employed in actuating said bar that said bar is actuated in said direction by and during the required actuation of said lever and movable in said direction independently of said lever.

Another object is to have two rock-shafts suitably arranged adjacent a brake-drum which is operatively mounted on the hereinbefore mentioned driving shaft and having suitably arranged arms carrying an equalizing bar, and to provide such an operative connection between each of said rock-shafts and a brake-shoe or brake-shoes employed in braking said driving shaft that said brake-shoe or brake-shoes are actuated into their braking position during the actuation of said bar in the required direction.

Another object is to render my improved brake-mechanism simple and durable in construction and reliable in its operation and capable of operating with undue shock to the vehicle, and to provide for and facilitate relative adjustment of component parts of said mechanism and to render the construction and relative arrangement of the parts such that the component parts are readily assembled and not liable to get out of order.

With these objects in view, and to attain any other object hereinafter appearing, this invention consists in certain features of construction, and combinations and relative arrangement of parts, hereinafter described in this specification, pointed out in the claims, and illustrated in the accompanying drawings.

In said drawings, Figure 1 is a top plan illustrating brake-mechanism embodying my invention. Fig. 2 is a vertical section taken along the line 2—2, Fig. 1. Fig. 3 is a vertical section taken along the line 3—3, Fig. 2, looking forwardly. Fig. 4 is a vertical section taken along the line 4—4, Fig. 3, looking inwardly. Fig. 5 is a horizontal section, in detail, taken along the line 5—5, Fig. 2, looking upwardly. Fig. 6 is a horizontal section, in detail, hereinafter described. Fig. 7 is a side view, partly in section, of the larger portion of the brake-mechanism illustrated in Fig. 2, but Fig. 2 shows the means for actuating the brake-shoes in their normal position, whereas Fig. 3 illustrates the actuation, into their braking position, of the brake-shoes adapted to brake the rear wheels and connected axle-sections. Fig. 8 is a side view illustrative of the operation of a portion of the brake-mechanism illustrated in Fig. 2. Figs. 3, 4, 5, 6, 7 and 8 are drawn on a larger scale than Figs. 1 and 2, and portions are broken away in the drawings to reduce their size.

Referring to Figs. 1 and 2 of said drawings, A indicates the two rotatable sections of the rear axle of an automobile or motor-vehicle, which sections are arranged transversely of the vehicle and substantially in line endwise, and *a* indicates the inner end-portion of the hubs of the rear wheels of the vehicle. Each wheel-hub *a* is operatively connected with the adjacent axle-section A in any approved manner. Each axle-section A is surrounded by a casing B which extends longitudinally of said axle-section between the wheel-hub *a* connected to the outer end of said axle-section and the rear end-portion of the transmission-case C of the vehicle. Said transmission-case has said end-portion thereof arranged centrally between the wheel-hubs *a* in the usual manner and extends forwardly in a horizontal plane. At the inner end of each wheel-hub *a* is arranged a brake-drum which is secured to said hub in any approved manner and has its annular brake-member *a'* arranged concentrically relatively to said hub and the connected axle-section. Each axle-casing B is provided adjacent the inner end of the adjacent brake-drum with two arms *b* and *b'* projecting forwardly and rearwardly respectively, and a brake-shoe D is arranged internally of said brake-drum and held from rotating by a stud 10 rigid with the rearwardly extending arm *b'* of the adjacent axle-casing B. Said brake-shoe is normally in suitable proximity and loose relatively to the internal surface of the annular brake-member *a'* of the adjacent brake-drum and adapted to be actuated into braking engagement with said member of said brake-drum. Said brake-shoe extends circumferentially of the adjacent axle-section A nearly but not entirely around said axle-section and therefore has its terminal ends spaced. Preferably said ends of said brake-shoe are arranged adjacent the forward side of the adjacent brake-drum.

Between the terminal ends of each brake-shoe D extends a brake-operating rock-shaft E which is arranged transversely of the vehicle and horizontally, and said shaft is forward of and in suitable proximity to and substantially parallel with the adjacent axle-section. The two shafts E (see Figs. 1, 2 and 7) are arranged in line endwise. Each shaft E is provided between the terminal ends of the adjacent brake-shoe D with two cams 12 arranged at the forward side and rear side respectively of the shaft and adapted to engage and farther separate said ends of said brake-shoe during the rotation of the shaft to the extent required and thereby actuate said brake-shoe into its braking position, shown in Fig. 7, against the action of a suitably applied spiral spring *d*, shown in Fig. 2, and cause said brake-shoe to clampingly engage the internal surface of the brake-member *a'* of the adjacent brake-drum, and said spring extends between and is suitably attached to opposite end-portions of said brake-shoe. Each shaft E is supported in any approved manner, as, for instance, from the forward arm *b* of the adjacent axle-casing. Each shaft E is provided at the inner side of the adjacent supporting member *b* with an upwardly extending arm 13 which is actuated forwardly, as will hereinafter appear, to effect the brake-applying or braking rotation or movement of said shaft and thereby result in the actuation of the adjacent brake-shoe D into its braking position.

Forward of and in suitable proximity to each cam-shaft E is a shaft F which is substantially parallel with said cam-shaft and consequently arranged horizontally and transversely of the vehicle. The two shafts F are shown arranged in line endwise. Each shaft F is supported in any approved manner, as, for instance, from the forward arm *b* of the adjacent axle-casing and from a bracket 14 with which the transmission-case C is provided. Each shaft F is shown provided at its inner end with an upwardly projecting arm 15, and the arms 15 of the two shafts F are connected together by an equalizing bar 16 which is arranged substantially horizontally and extends between and has bearing in said arms, as shown in Figs. 1, 6 and 7, and said bar and said shafts are substantially parallel. Said bar is shown embraced centrally between its ends by the slotted rear end of a rod 17 which is vertically pivoted, as at 18, to said bar, and shown arranged over and longitudinally of the transmission-case, and consequently longitudinally of the vehicle, and extends a suitable distance forwardly of said bar. I would here remark that Fig. 6 is a horizontal section taken centrally through said bar and shows the connections of said bar with the shaft-arms 15 and the rod 17. The arm 13 of each cam-shaft E is operatively connected by a link 19 with an upwardly extending arm 20 of the adjacent shaft F. It will be observed that the forward movement of the arms 13 is against the action of spiral springs 22 which act to retain the mechanism comprising said arms in a normal position. Preferably a spring 22 is arranged adjacent the arm 13 of each cam-shaft E and attached at one end to said arm and at its opposite end to the forward arm *b* of the adjacent axle-casing. Obviously therefore the simple and reliable mechanism comprising the links 19, the shafts F and their arms 15 and 20 and the equalizing bar 16 constitute such an operative connection between the rod 17 and the arms 13 of the cam-shafts E that forward movement of said rod effects the actuation of said arms forwardly simultaneously and consequently effects the rotation of both cam-shafts E simultaneously against the action of the springs 22 and thereby results in the actuation of the brake-shoes D simultaneously into their braking position. It will be observed therefore that the cam-shafts E and their cams 12 and arms 13, the links 19, the shafts F and their arms 15 and 20, and the equalizing bar 16 form mechanism for actuating the brake-shoes D simultaneously into their braking position, and that the relative arrangement of the parts is such that said mechanism is operated to effect the actuation of said brake-shoes into their braking position during forward endwise movement of the rod 17.

The rod 17 (see Figs. 2, 3 and 7) is operatively connected at its forward end, through the medium of a rigid upright link 24, with an upright hand-lever 25 which extends through a slot 26 in the foot-board 27 of the vehicle and is supported from said foot-board and has its fulcrum 28 below the foot-board. The slot 26 is of course large enough in dimensions to accommodate the location and operation of said lever, and preferably the lever has its axis parallel with the equalizing bar 16 and consequently parallel with the shafts F. The lever 25 extends a suitable distance below its fulcrum 28, and the link 24 is provided at its upper end with a forwardly and upwardly projecting lug 30 horizontally pivoted, as at 31, to a forwardly and downwardly projecting lug 32 formed on the lower end of the lever. Said link 24 is provided rearward of its lug 30 with a top surface 33 arranged, in the normal position of said link as shown in Fig. 2 and also in the position of the lever 25 shown in Fig. 7, under and abutting against the lower end of the lever. It will be observed therefore that the downwardly facing lower end surface 34 of said lever is arranged over the upper end of the link 24 and in position to prevent swinging or movement of said link, in the normal position of said lever, rearwardly independently of the lever, but said link, being pivoted to the lever at the forward side of the upper end of said link and having its axis parallel with the fulcrum of the lever, is arranged to be swung or moved forwardly independently of said lever, as shown in Fig. 8.

Under the foot-board 27 and at one side of the lever 25 is a segmental rack 35 secured to said foot-board. The rack extends circumferentially of the under side of and is arranged concentrically relatively to the fulcrum 28 of the lever 25 and has its teeth formed at its under side, and a pawl 36 is normally in engagement with said rack and has an arm 37 extending upwardly and through the slot 26 in the foot-board. The pawl-arm 37 is pivoted, as at 38, above the foot-board to said lever and has its axis parallel with the axis of the lever. Between the pawl-arm 37 and the lever 25, above the axis of said arm, is a spring 39 supported from the lever and acting to retain the pawl in its operative position. The relative arrangement of the parts is such that the rack 35 and pawl 36 do not interfere with the actuation of the lever 25 against the action of the springs 22 and in the direction required to effect the brake-applying or braking movement of the cam-shafts E by the forward endwise movement of the rod 17, but constitute locking means for locking said lever against movement in the opposite direction.

The axle-sections A are driven in the usual manner by power transmitted, through the medium of the usual gearing (not shown) within the rear end-portion of the transmission-case, from a driving shaft G arranged within and extending endwise of said transmission-case and consequently longitudinally of the vehicle, and said shaft is arranged therefore at a right angle to said axle-sections. The transmission-case, adjacent the forward end-portion of the rod 17, has a diametrical enlargement 40 which is large enough in dimensions to house a brake-drum $g$ and two brake-shoes H. The brake-drum $g$ is operatively mounted on the driving shaft G and has its annular brake-member $g'$ arranged concentrically relatively to said shaft. The brake-shoes H are arranged externally and extend circumferentially of the upper portion and lower portion respectively of the brake-member $g'$ of the brake-drum $g$. Said brake-shoes H are normally loose relatively to and adapted to be actuated into braking engagement with the brake-drum $g$. Each brake-shoe H does not extend quite half way around the brake-drum $g$ so that the brake-shoes H are spaced at their terminal ends, and said ends of said brake-shoes are shown arranged at the sides of said drum.

Two brake-operating rock-shafts I are arranged horizontally at opposite sides respectively of the brake-drum $g$ and preferably at a right angle to the driving shaft G and substantially in line endwise and parallel with the shafts E and F. The shafts I are supported from the transmission-case in any approved manner. One of the shafts I extends between the terminal ends of the brake-shoes H at one side of the brake-drum $g$, and the other of the said shafts extends between the terminal ends of said brake-shoes at the opposite side of said drum. Each shaft I is provided between the adjacent terminal ends of the brake-shoes H, as shown in Fig. 4, with two arms 42 and 43 projecting forwardly and rearwardly respectively, and each terminal end of the upper brake-shoe H (see Fig. 4) is operatively connected by a link 44 with the forward arm 42 of the adjacent shaft I, and the adjacent terminal end of the lower brake-shoe H is operatively connected by a link 45 with the rearward arm 43 of said shaft. Each shaft I is shown provided externally of the transmission-case with an upwardly extending arm 46, and the arms 46 of the two shafts I are connected together by an equalizing bar 47 which is arranged substantially horizontally and extends between and has bearing in and is therefore carried by said arms, as shown in Figs. 1 and 3. Said bar 47 is shown embraced centrally between its ends by the slotted rear end of a rod 48 which is vertically pivoted, as at 49, to said bar and shown arranged over the brake-housing enlargement 40 of the transmission-case and extends forwardly of said bar a suitable distance. It will be observed therefore that the relative arrangement of the parts is such that forward endwise movement of the rod 48 actuates the equalizing bar 47, and consequently the shaft-arms 46, forwardly and that the requisite forward movement of said shaft-arms simultaneously results in effecting the brake-applying or braking rotation of the shafts I and consequently in the actuation of the brake-shoes H simultaneously into their braking position.

Preferably the rod 48 is operatively connected at its forward end with a foot-lever 50 which extends through a slot 51 in the foot-board 27 and is shown supported from the transmission-case. The slot 51 is of course large enough in dimensions to accommodate the location and operation of the lever 50, and preferably said lever has its fulcrum 52 parallel with the equalizing bar 47 and consequently parallel with the shafts I. It will be observed therefore that the relative arrangement of the parts is such that the shafts I and their arms 42, 43 and 46, the links 44 and 45, the equalizing bar 47 and the rod 48 form a simple and reliable operative connection between the foot-lever 50 and the brake-shoes H, and that forward movement of said lever results in the actuation of said brake-shoes simultaneously into their braking position. A spring 53 which (see Fig. 2) is attached at one end to the lever 50 and at its opposite end to the transmission-case, acts to retain said lever and the connected brake-shoes H in their normal position, and therefore the actuation of said brake-shoes into their braking position is against the action of said spring.

The arm 46 of each rock-shaft I is operatively connected with a rod 55 which extends rearwardly from said arm and is provided at its rear end (see Figs. 2 and 5) with a pin 56 projecting laterally of said rod and into a slot 57 which is formed in and extends laterally through and longitudinally of the forwardly projecting enlargement or member 58 of the upper end-portion of an another upwardly extending arm 59 with which the adjacent shaft F is provided, and said slot extends therefore longitudinally of said rod. The pin 56 of each rod 55 is shown abutting at its forward side against the rear end of a screw 60 which is threaded into the forward end of the enlargement or member 58 of the adjacent shaft-arm 59 and arranged in line endwise with the slot 57 in said arm and extends forwardly of said arm, and it will be observed that the rear end of said screw forms a rearwardly facing shoulder or abutment for the forward side of said pin, and that said shoulder or abutment is adjustable longitudinally of said rod. A lock-nut 61 is screwed onto said screw 60 externally of said shaft-arm 59 and employed in securing said screw in the desired adjustment.

By the construction and relative arrangement of the parts hereinbefore described it will be observed that the screw 60 of the arm 59 of each shaft F and the engaging pin 56 of the adjacent rod 55 form an operative connection between said shaft-arm and said rod so far as concerns forward movement of said shaft-arm with said rod during the forward movement of the arms 46 of the shafts I by the actuation of the foot-lever against the action of the spring 53. Obviously therefore the pins 56, the shafts F and their arms 20 and 59, the screws 60 of said shaft-arms, the links 19 and the cam-shafts E and their cams 12 and arms 13 constitute mechanism operatively connected with the rods 55, and the relative arrangement of the parts is such that the actuation of the brake-shoes D into their braking position simultaneously occurs during forward endwise movement of said rods, and consequently the brake-shoes D and H are simultaneously actuated into their braking position during the required operation of the foot-lever 50. It will be observed therefore that by my improved brake-mechanism the driving shaft G and the rear wheels and connected axle-sections of the vehicle are braked simultaneously by the required operation of one and the same lever. It will also be observed that the slots 57 in the arms 59 of the shafts F extend such a distance rearwardly of the screws 60 of said arms that forward movement of said arms during forward movement of the rearward equalizing bar 16 by forward endwise movement of the rod 17 does not incur any forward endwise movement of the rods 55, and consequently the mechanism and connected brake-shoes H employed in braking the driving shaft G are not disturbed during the forward and braking movement, from the hand-lever 25, of said equalizing bar. It will also be observed that the rod 17 employed in effecting the forward movement of the rearward equalizing bar 16 and the link 24 move idly during the braking of the rear wheels and connected axle-sections simultaneously with and during the braking of the driving shaft G by the requisite operation of the foot-lever 50, so that the hand-lever 25 is not disturbed during said braking of said wheels and axle-sections by motion transmitted from the foot-lever. Obviously therefore the braking of said wheels and axle-sections by power transmitted from the hand-lever does not disturb the mechanism employed in braking the driving shaft, and the braking of said wheels and connected axle-sections by power transmitted from the foot-lever during the braking of the driving shaft does not disturb the hand-lever.

What I claim is—

1. The combination, with a rotary member of an automobile, a brake-shoe for braking said member, and a rock-shaft arranged transversely of the vehicle and having an arm provided with a slot arranged longitudinally of the vehicle, said rock-shaft being operatively connected with said brake-shoe, of an endwise movable rod arranged longitudinally of the vehicle and extending adjacent said arm and having a pin which extends into said slot, and a screw which is threaded into said arm at the forward end of and arranged in line endwise with and extends into said slot and forms a rearwardly facing abutment for said pin.

2. The combination, with a rotary member of an automobile, a brake-shoe for braking said rotary member, a rock-shaft arranged transversely of the vehicle and operatively connected with said brake-shoe, and an endwise movable rod arranged longitudinally of the vehicle and operatively connected with said shaft, of a lever arranged adjacent the forward end of and spaced from said rod, and a link operatively connected with said rod and pivotally connected to the lever and arranged to swing forwardly independently of the lever, said lever and said link having surfaces arranged to coöperate in preventing rearward swinging of the link independently of the lever.

In testimony whereof, I sign the foregoing specification, in the presence of two witnesses.

HENRY JOSEPHSON.

Witnesses:
 CASPER J. LEVER,
 EMIL W. KRYZ.